United States Patent
Sabine

(10) Patent No.: US 12,295,360 B2
(45) Date of Patent: May 13, 2025

(54) PERCHING AND ROOSTING DETERRENT

(71) Applicant: Gordon Sabine, Santa Monica, CA (US)

(72) Inventor: Gordon Sabine, Santa Monica, CA (US)

(*) Notice: Subject to any disclaimer, the term of this patent is extended or adjusted under 35 U.S.C. 154(b) by 0 days.

(21) Appl. No.: 17/681,769

(22) Filed: Feb. 26, 2022

(65) Prior Publication Data

US 2022/0369621 A1 Nov. 24, 2022

Related U.S. Application Data

(60) Provisional application No. 63/154,523, filed on Feb. 26, 2021.

(51) Int. Cl.
*A01M 29/32* (2011.01)

(52) U.S. Cl.
CPC .................. *A01M 29/32* (2013.01)

(58) Field of Classification Search
CPC ....... A01M 29/26; A01M 29/30; A01M 29/32
USPC .......................................................... 52/101
See application file for complete search history.

(56) References Cited

U.S. PATENT DOCUMENTS

| | | | |
|---|---|---|---|
| 4,143,437 A | 3/1979 | Voykin | |
| 4,748,778 A | 6/1988 | Rafter | |
| 5,058,335 A | 10/1991 | Richter | |
| 5,092,088 A * | 3/1992 | Way | A01M 29/32 52/101 |
| 5,353,543 A * | 10/1994 | Teraoka | A01M 29/26 116/22 A |
| 5,388,002 A | 2/1995 | Smith | |
| 5,497,585 A * | 3/1996 | Engler | A01M 29/32 52/101 |
| 5,649,394 A * | 7/1997 | Ohba | A01M 29/26 116/22 A |
| 5,666,767 A * | 9/1997 | Ohba | A01M 29/26 116/22 A |
| 5,845,607 A * | 12/1998 | Kastner | A01M 29/06 119/713 |
| 6,003,471 A * | 12/1999 | Ohba | A01M 29/26 119/713 |
| 6,918,214 B2 | 7/2005 | Sabine | |
| 11,419,326 B2 * | 8/2022 | Ravuna | A01M 29/32 |
| 2002/0011036 A1 * | 1/2002 | Sabine | A01K 15/02 119/713 |
| 2005/0144853 A1 | 7/2005 | Sabine | |
| 2010/0251633 A1 | 10/2010 | Sabine | |
| 2013/0042544 A1 | 2/2013 | Sabine | |
| 2015/0320030 A1 | 11/2015 | Sabine | |

OTHER PUBLICATIONS

Sabine, Birdzoff Tower Guard Sales Brochure, Mar. 2008.

* cited by examiner

*Primary Examiner* — Brent W Herring
(74) *Attorney, Agent, or Firm* — One LLP

(57) ABSTRACT

A system and apparatus for deterring birds from perching or roosting on manmade structures includes one or more resilient members supporting interconnecting or cantilevered elongated members. The resilient members and elongated members are arrayed over the structure to be protected and are tuned such that an attempt by a bird to perch on any one of the elongated members causes vigorous motion of the elongated members and resilient members, frightening the bird away.

17 Claims, 16 Drawing Sheets

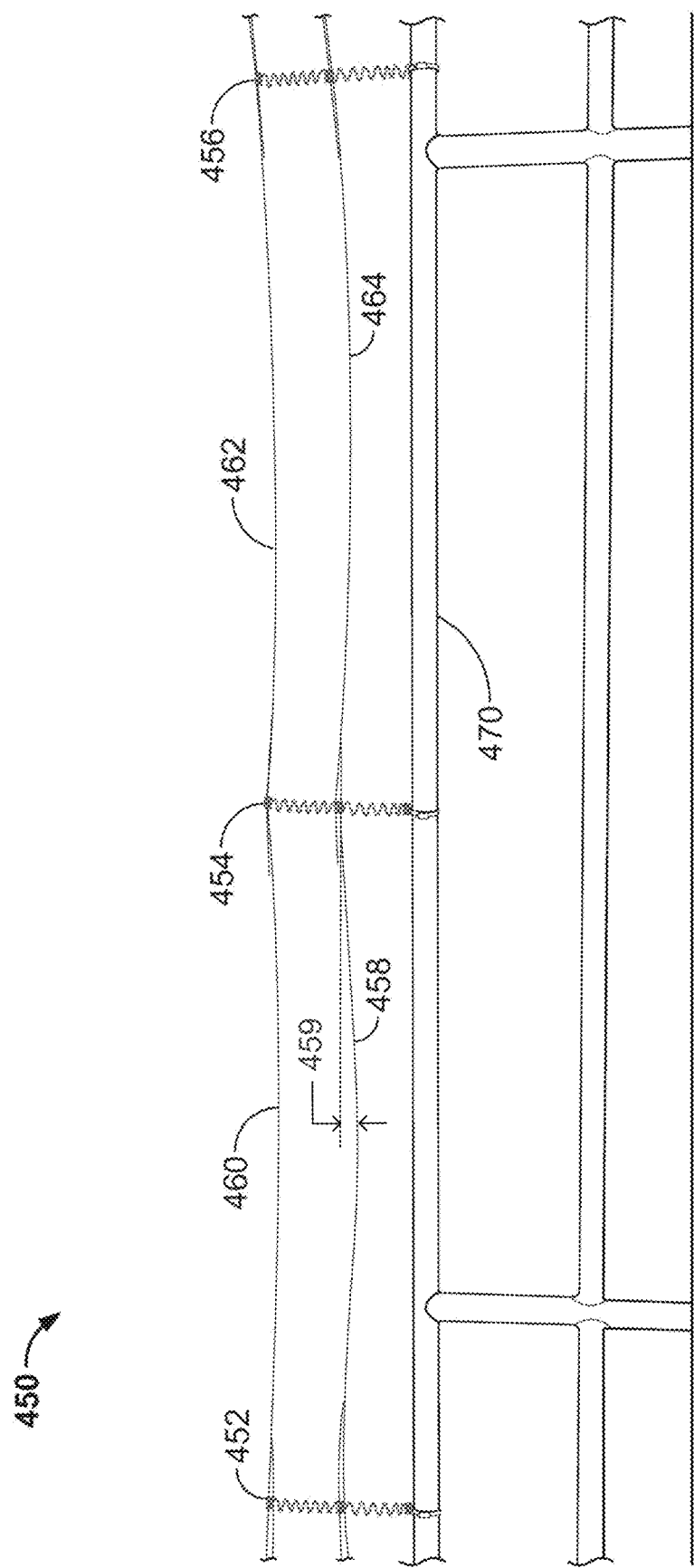

PERCHING AND ROOSTING DETERRENT

PRIORITY CLAIM

The present application claims priority to U.S. Provisional Application Ser. No. 63/154,523 filed Feb. 26, 2021, which is incorporated herein in its entirety by reference.

FIELD

The present application relates to systems, apparatus, or methods for deterring birds from perching on manmade structures.

BACKGROUND

Certain manmade structures, for example, railings and ledges, are attractive to medium (e.g., gull-sized) or larger birds for perching or roosting. This can pose a problem when the perching behavior and related bird waste causes a nuisance or hazard to people using the structure or is otherwise inappropriate for avian use.

Various structures are known in the art to discourage perching or roosting. For example, vertical pins or spikes are arranged over the upper surface of the structure, depriving the birds of horizontal surface area useful for perching or roosting. However, this approach consumes a relatively large amount of material, is prone to fouling or other damage, and may render certain structures for example railings unfit for their intended purpose. Another approach uses lateral (e.g., generally horizontal) wires strung between rigid posts over upper surfaces of the structure, making it difficult for medium or large birds to land or take flight. While this saves material and installation cost, and preserves the utility of most structures, smaller birds may find the lateral wires suitable for perching. In addition, the rigidly supported wire or the rigid support may increase hazards to users in environments susceptible to slips and falls.

For example, preventing perching of gulls and similar aquatic birds on railings and other surfaces of offshore marine facilities, ships and the like is an important application for perch deterrence. Bird droppings around railings and walkways can increase the risk of slips and falls, especially in damp marine environments, besides being malodorous and carrying risk of bacterial contamination. In such environments, rigid spikes and supports may be entirely unsuitable due to the risk of injury in a slip or fall.

It would be desirable, therefore, to develop new methods and other new technologies for deterring perching and roosting on manmade structures, that overcome these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, an apparatus for preventing perching of birds, includes at least two coil springs supporting at least one lateral wire over a manmade structure to be protected from perching birds, and a fastener securing a base of each of the coil springs to the manmade structure in transverse relation thereto. Each of the at least two coil springs may include a portion of dead coils holding the at least one lateral wire and a portion of live springs for flexibility. A u-shaped clip may be inserted into each of the at least two coil springs encompassing the at least one wire between legs thereof. In embodiments, the fastener may be a hose clamp inserted through a lower coil of the each of the at least two coil springs. In other embodiments, the fastener may be a cylindrical receptacle enclosing a lower portion of the each of the at least two coil springs.

In a related aspect, a method for preventing perching of birds on a manmade structure may include installing an apparatus as described above to the manmade structure.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 4B shows an assembly of several coil springs in a linear configuration to protect a railing.

DETAILED DESCRIPTION

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices may be shown in simplified form to facilitate describing these aspects.

The present application discloses a system, apparatus, and method to prevent medium to large birds from perching on manmade structures. The system comprises of a resilient member (also referred to herein as a flexible support) for example a spring, one or more transverse elongated members (for example wire(s), cables, wire ropes, cords, or lines) a capture clip or equivalent, and a fastener or attachment. In embodiments, a resilient member comprising a coil spring may have dead coils in different locations along its length. Such a spring may be mounted vertically on the structure to be protected or can be adjusted 360 degrees to exclude a variety of areas. In embodiments, a wire may be inserted between two of the dead coils to provide a transverse element passing over an area to be protected. If a subsequent spring(s) is/are added, the same wire may be inserted into the corresponding coils of the next spring to connect the two units. Wires may be used to span between springs at different levels where the dead coils are similarly located. A capture clip (an upside down 'u' shaped wire) may be inserted inside the coil spring and by position does not allow the inserted wire(s) in the spring to disengage.

More generally, a system and apparatus for deterring perching and roosting of birds may include a series of resilient members, also called flexible supports, with interconnecting transverse elongated members (e.g., wires, cables, cords, ropes, cords, or lines) extending between the resilient members. The resilient members suspend the elongated members over the structure to be protected, for example a railing or ledge. The elongated members extend over the area to be protected and are held in place by the resilient members, which are attached to the structure to be protected. The system of resilient members and elongated members is tuned such that a bird attempting to rest on the structure will naturally alight on the elongated member, causing a chaotic motion of the elongated member and any connected resilient members that frightens the bird away. Various configurations of flexible supports and connecting elongated members are described in connection with the figures below.

Figure 1A:
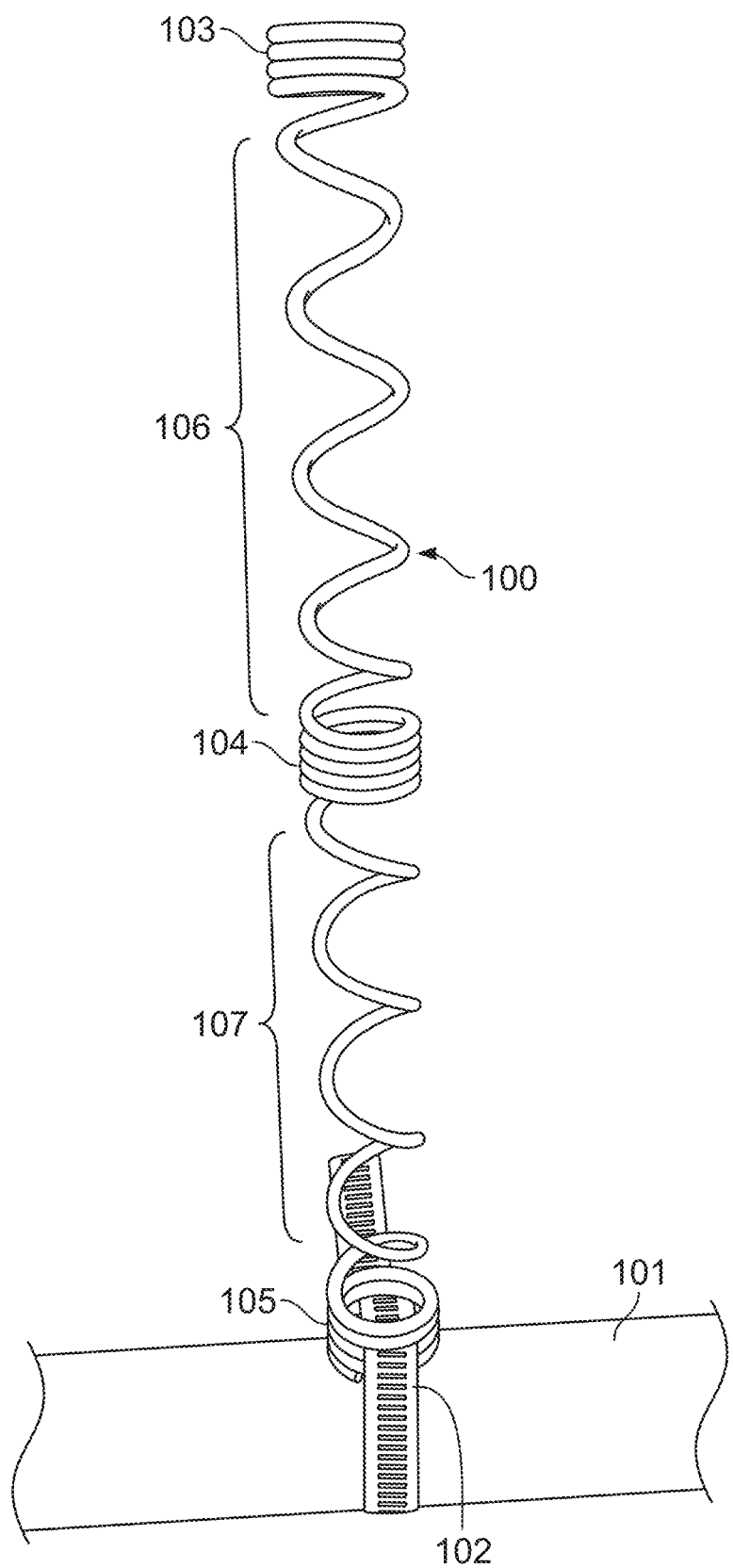
FIG. 1A shows a coil spring support for supporting one or more lateral wires strung between such supports.

Referring to FIG. 1A, a flexible support may be, or may include, a coil spring 100 mounted perpendicularly to a rail 101 by a clamp 102, for example a hose clamp or other suitable fastener. This spring has three sections of dead coils: top 103, middle 104, and bottom 105. There are two sections of live coils: top 106 and bottom 107. The number of dead or live coils in any section can be variable. The hose clamp 102 is inserted in between two of the bottom dead coils 105 of the spring 100. Once tightened, the hose clamp 102 will hold the spring 100 in place on the rail 101, being the surface to be protected from perching. An advantage of a coil spring for a flexible support is that the spring can bend in any radial direction and return to its neutral position when the load is removed. A flexible wire arranged as a cantilever may also be suitable but lacks structure for holding the lateral elongated members.

Figure 1B:
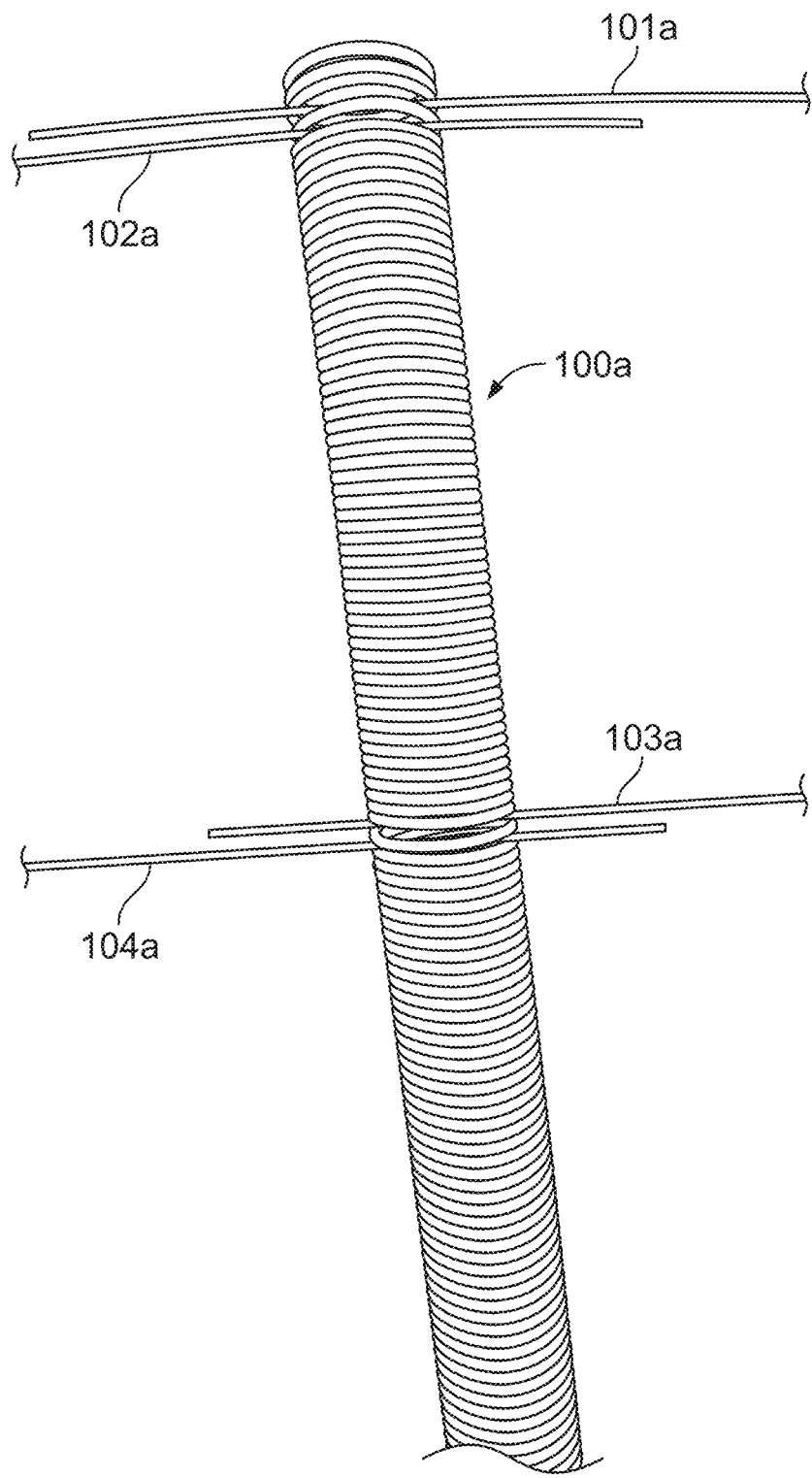
FIG. 1B shows an alternative coil spring support with attached lateral wires.

A flexible support may be, or may include, single spring 100a made entirely with dead coils, as shown in FIG. 1B. Elongated members comprising two wires 101a, 102a are inserted laterally (e.g. horizontally where flexible supports are vertical) in between dead coils towards the top of the spring 100a and two wires 103a, 104a are inserted in between dead coils in the middle of the spring. A spring can have as few or as many dead coil sections as needed. However, the flexible support should be selected to bend and snap back when a bird of anticipated mass alights on an attached elongated member. The wires 101a, 102a, 103a and 104a are arranged to extend perpendicularly from the spring 100a and serve as elongated members.

Figure 2A:
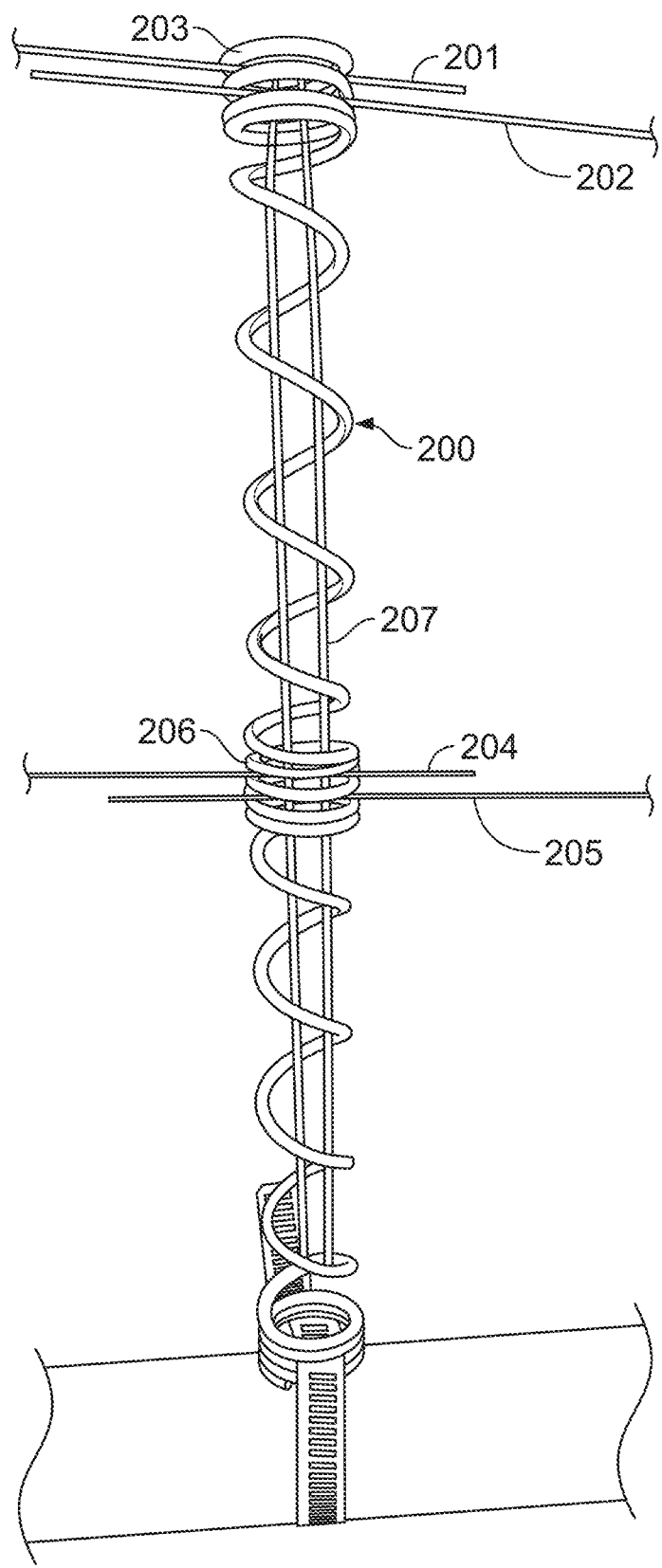
FIG. 2A shows the coil spring support of FIG. 1A with attachment to a structure (railing), attached lateral wires, and wire clip.

FIG. 2A shows the coil spring support of FIG. 1A with attachment to a structure (railing), attached lateral (e.g., generally horizontal) wires, and wire capture clip. A single spring 200 is mounted vertically on a rail with two laterally placed wires 201, 202 inserted horizontally in the top dead coils 203, two wires 204, 205 inserted into the middle dead coils 206, and the capture clip 207 is inserted vertically into the interior of the coil 200 to hold wires in place. In the illustrated embodiment, the capture clip 207 is a u-shaped wire with two legs of approximately equal length. When inserted into the coil, the lateral wires are captured between the legs of the clip 207, so they cannot slip out of from between the dead coils. In turn, legs of the capture clip 207 expand against interior surfaces of the wire coils, such that friction between the legs and the interior of the coil prevents the capture clip from slipping out of the coil.

Figure 2B:
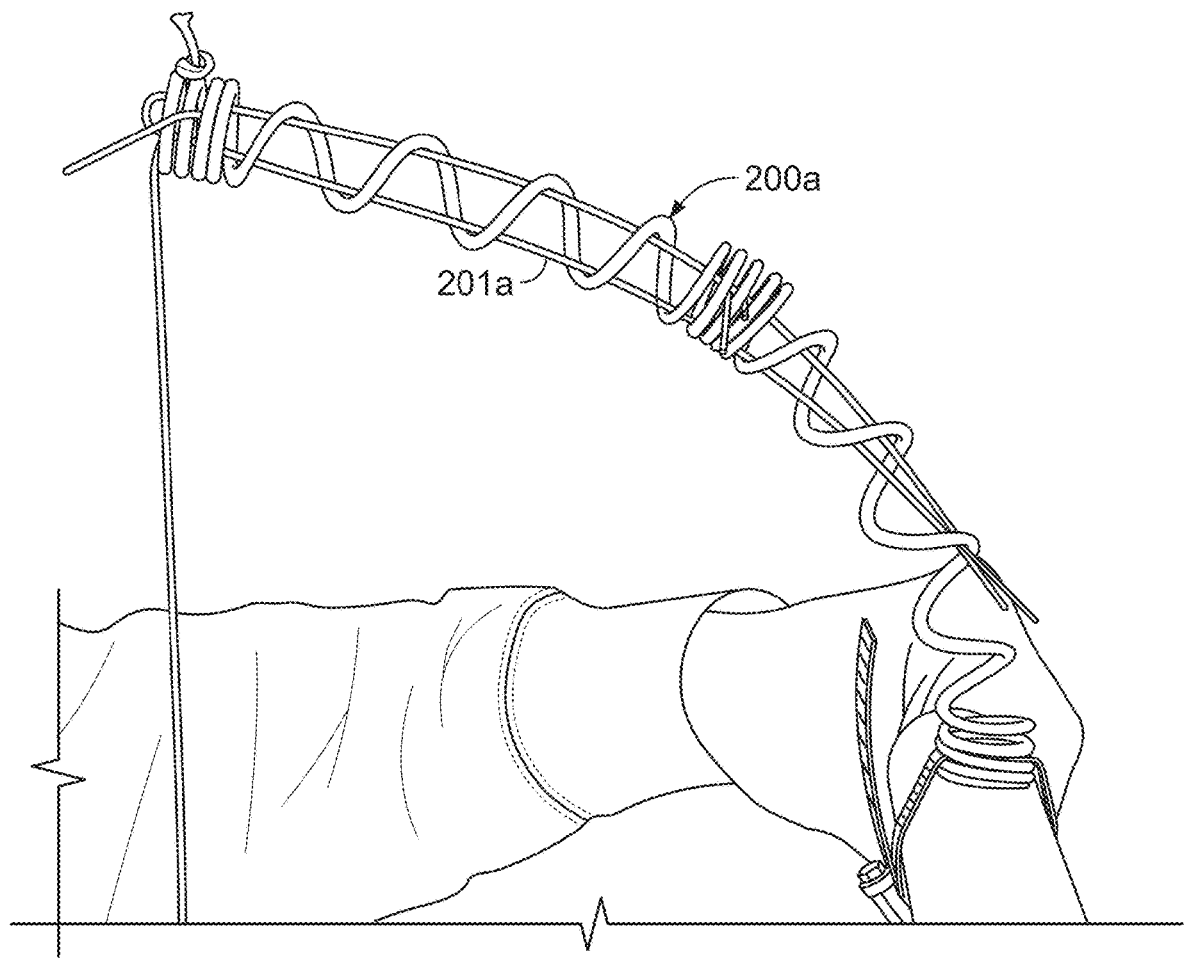
FIG. 2B shows flexure of a coil spring support under a lateral load.

By way of further example, FIG. 2B shows a single spring 200a with a capture clip 201a being pulled to one side by a cord that is only present to display the flexibility of the spring. A spring used for a flexible support may have a varying level of flexibility based on the placement and presence of live and dead coils. The flexible support should be configured to respond vigorously to the birds to be deterred, which may vary in mass depending on the application. For example, the flexible support should be flexible enough to deflect substantially (e.g., by 0.5 inches or more) under the lateral load imposed by a landing bird, resilient enough to spring back immediately after being deflected, and rigid enough to remain generally upright under anticipated lateral wind loads during operation.

Figure 2C:
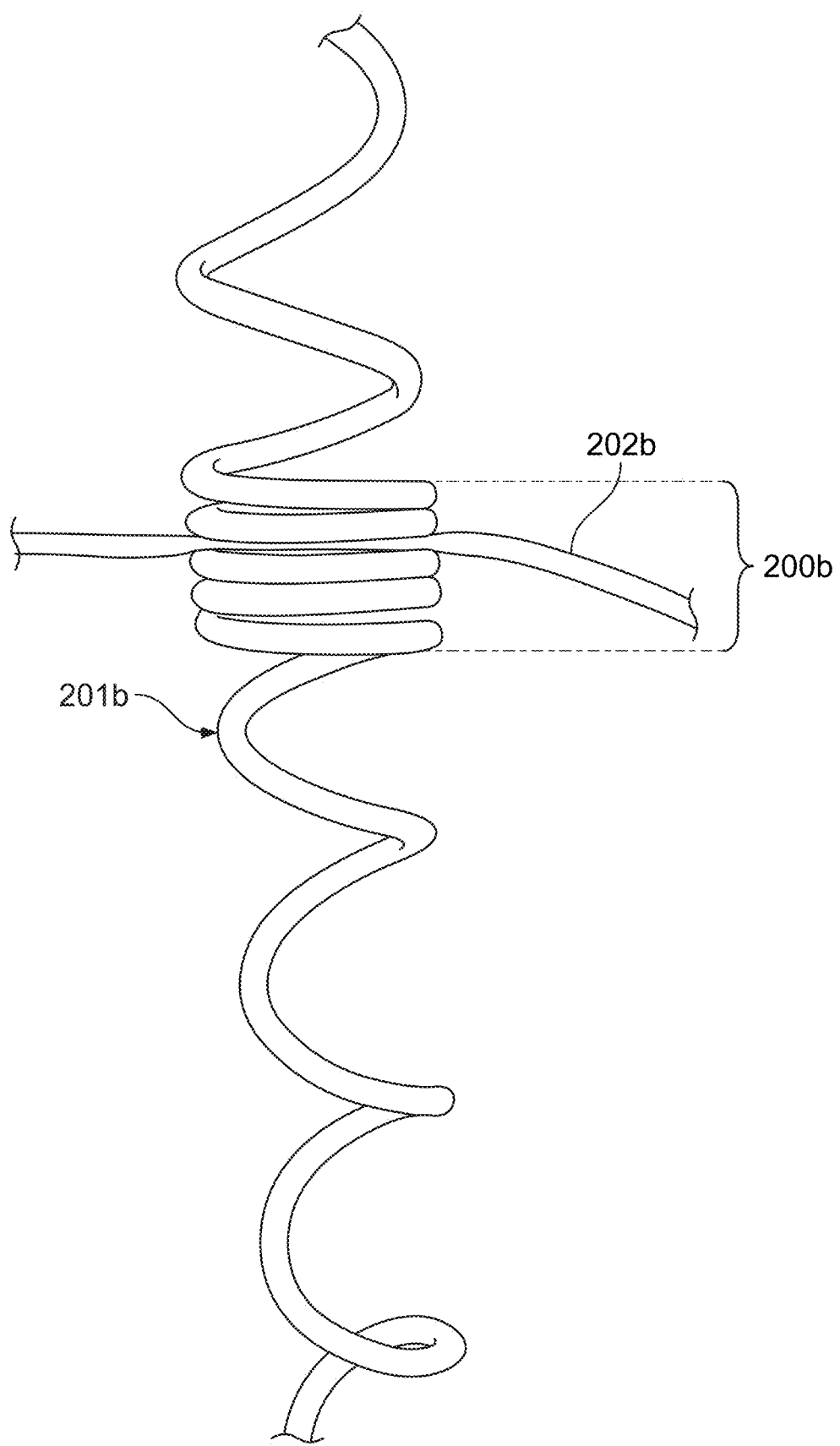
FIG. 2C shows a detail of an attached lateral line.

FIG. 2C shows a close up of middle dead coils 200b on a single spring 201b middle coils with a cord 202b, as another example of connecting a transverse elongated member to a dead coil.

Figure 2D:
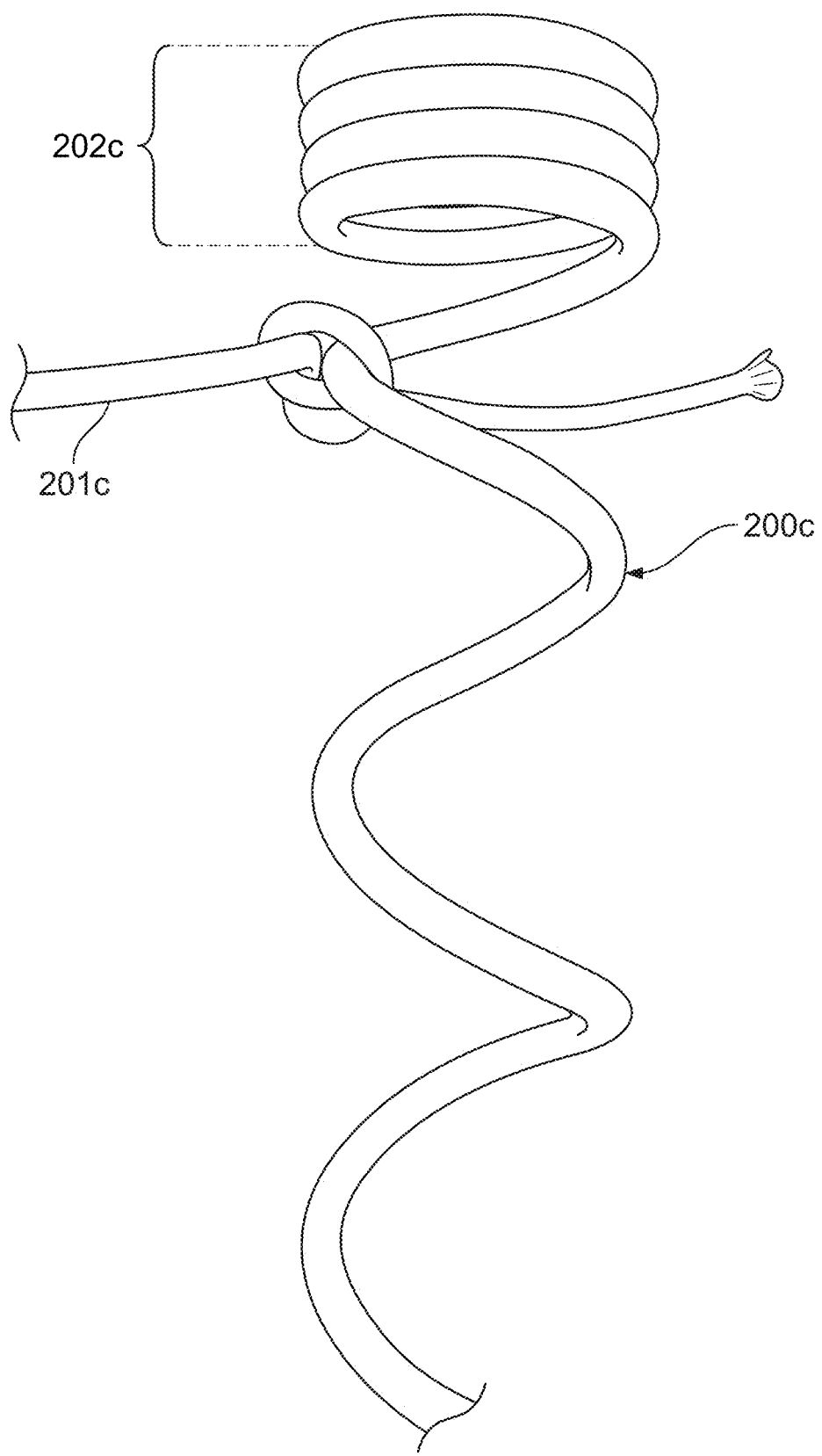
FIGS. 2D-2E shows details of alternative attachments for lateral lines.

FIG. 2D shows a closeup of a single spring 200c with a cord 201c knotted on a live coil, and yet another example of connecting a transverse elongated member to a flexible support. Optionally (not shown) the knot can be secured in between the dead coils 202c.

Figure 2E:
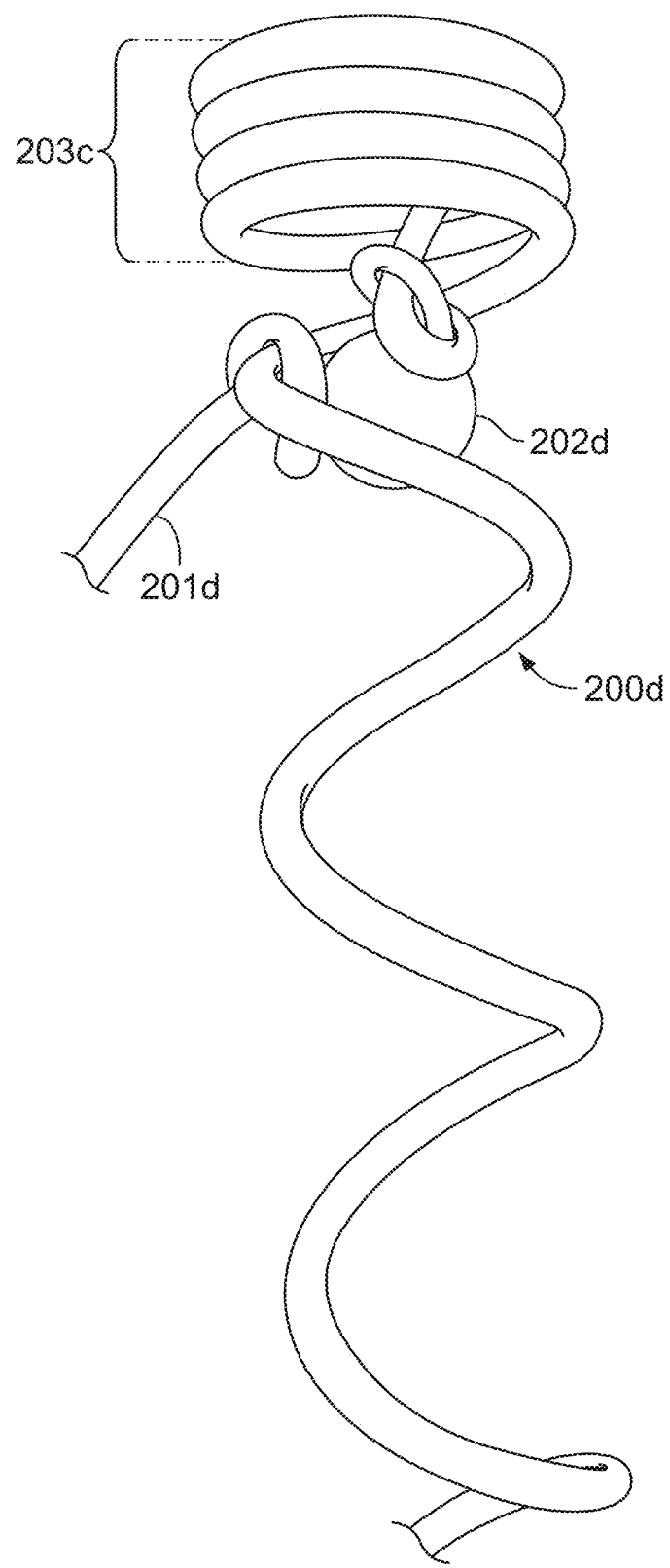

FIG. 2E shows a closeup of a single spring 200d with a cord 201d and ball attachment 202d. The cord 201d is tied to both the spring 200d and the ball 202d. The cord 201d can be secured in between the top dead coils 203d.

Figure 3:
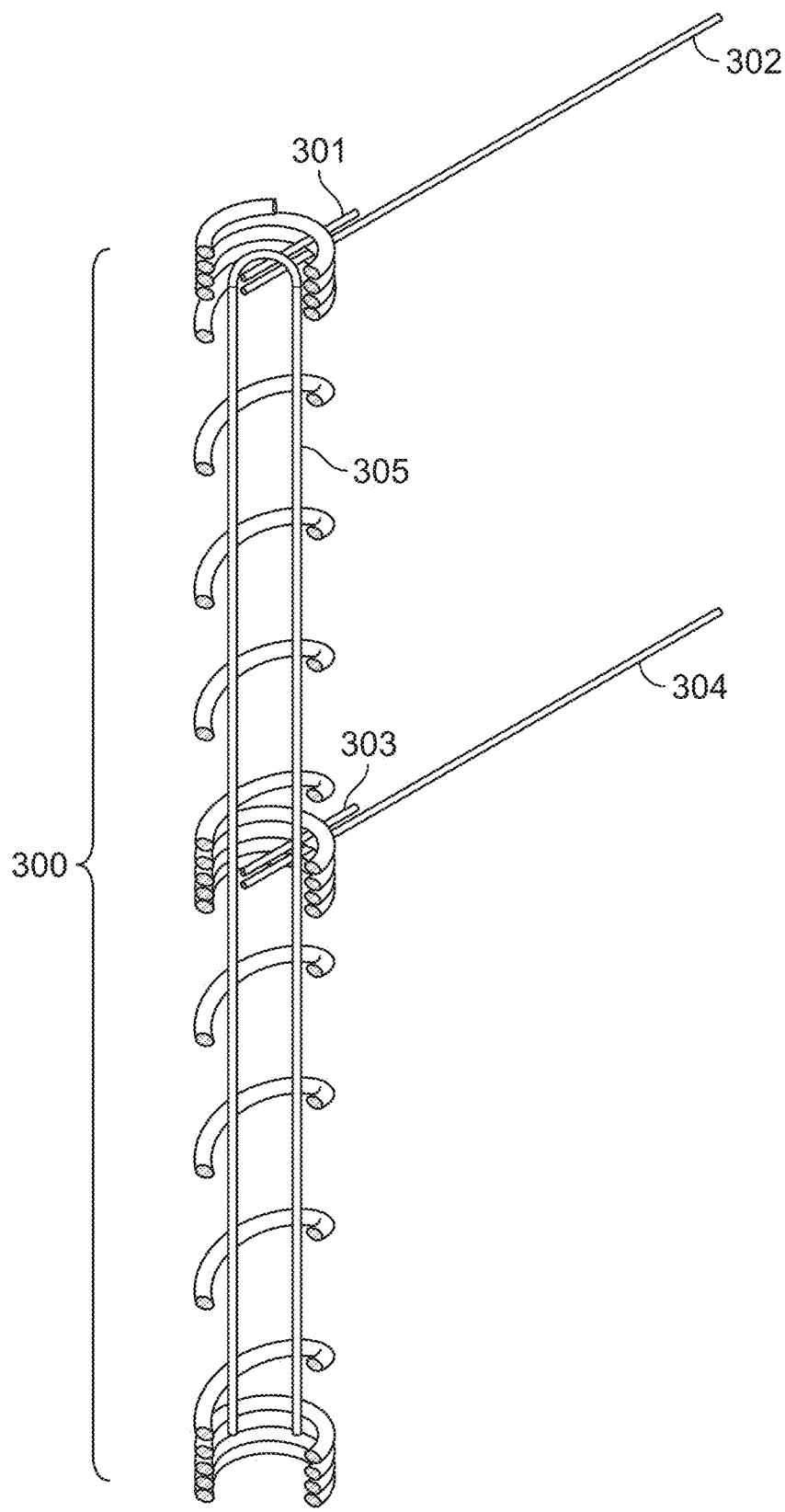
FIG. 3 is a perspective view illustrating the coil spring support of FIG. 1A with attached lateral wires, and wire clip.

Aspects of the foregoing examples are further illustrated by FIG. 3, showing a cut view of a spring 300, two laterally (e.g., generally horizontally) placed wires 301, 302 in between the top dead coils, two laterally placed wires 303, 304 in between the middle dead coils, and the capture clip 305. The capture clip 305 fits inside the spring 300 and outside all four wires 301, 302, 303, 304, preventing them from falling out of the dead coils if disturbed.

Figure 4A:
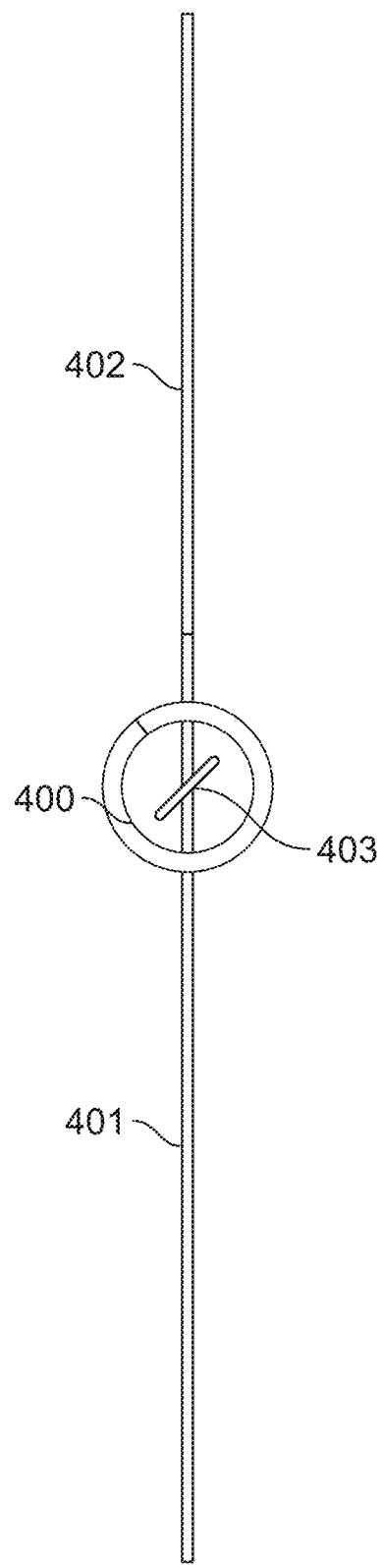
FIG. 4A is a plan view illustrating the arrangement of FIG. 3.

Consistent with the foregoing, FIG. 4A shows an illustrative top view of a spring 400, two laterally placed wires 401, 402, serving as elongated members, and a capture clip 403 placed perpendicularly. In an actual assembly not shown in FIG. 4A, legs of the capture clip extend into and press against interior surfaces of the coil spring 400, creating frictional contact with the coil spring that prevents the capture clip from slipping out during use.

FIG. 4B shows an assembly 450 of several coil springs 452, 454, 456 in a linear configuration to protect a railing 470. The two left coil springs 452, 454 support each lateral wire 460, 458 near opposite ends thereof. Similarly, the two coils springs 454, 456 on the right support the lateral wires 462, 464. The assembly 450 can be extended to protect any desired length of railing or similar structure. Each lateral elongated member may be, or include, a wire, cable, rope, cord, or line that may extend between the coil springs in a generally perpendicular (e.g. horizontal in the illustrated installation) direction, and may be flexible and slack enough to sag visibly under its own weight, for example as pointed out at 459. The spring supports and slack, flexible lateral wires enable chaotic motion of the lateral wires when contacted by a bird, which deters perching behavior.

Figure 5:
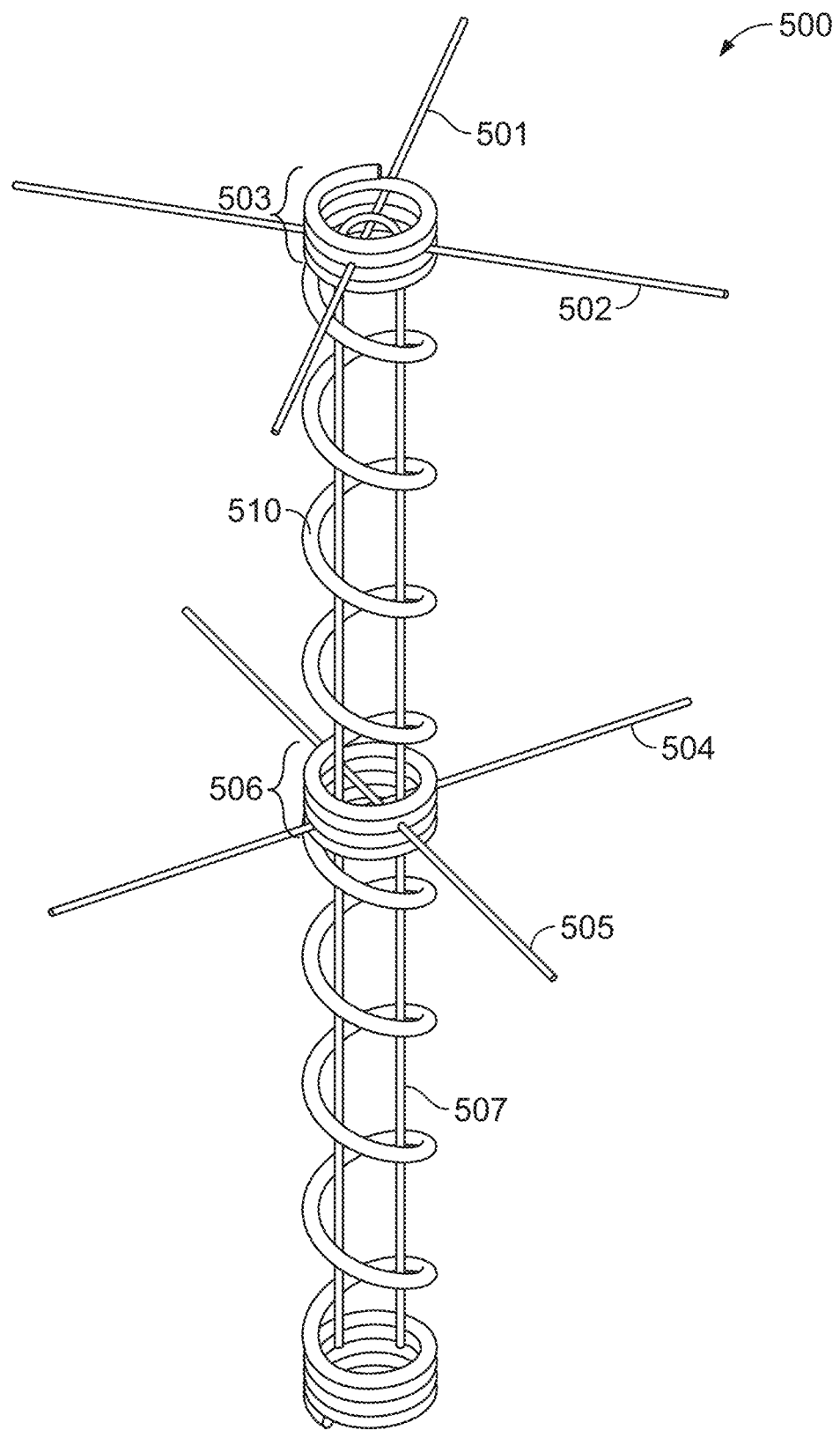
FIG. 5 is a perspective view illustrating the coil spring support of FIG. 1A with attached pairs of transverse lateral wires, and wire clip.

An advantage of using coil springs for flexible supports is that the coils allow convenient installation of the lateral wires extending in any radial direction, as illustrated by the following figures. FIG. 5 shows a single spring assembly 500, with two wires 501, 502 inserted perpendicularly in between different ones of the top dead coils 503 of the supporting spring coil 510, two wires 504, 505 inserted perpendicularly in between two of the middle dead coils 506, and a capture clip 507 inserted at the intersection of the two wires in each dead coil section. The middle wires' orientation 504, 505 is rotated 45 degrees from the top wires 501, 502, but can be placed at any angle. Using different coils to hold each lateral wire provides for a more secure grip by the coil on the wire and greater ease of installation.

Similar flexible supports may be used to protect a generally planar horizontal surface by installing in an array pattern over the surface. Each single spring assembly 500 protects a generally circular or polygonal area having a diameter or major chord approximately equal to the length of the length of the wires 501, 502, 504, 505. For example, a spring assembly having five-foot long lateral wires will protect a circular area about five feet in diameter. Each spring assembly may be freestanding, meaning that its lateral wires are not connected to any other support, such that its elongated members are cantilevered from a single flexible support. Each lateral wire 501, 502, 504, 505 is supported only by the single coil 510. In such embodiments, the elongated member should be sufficiently rigid to extend over the surface to be protected. For example, a steel wire of approximately 0.03 to 0.125 inches diameter may be used. This contrasts to installations on a railing or similar structure that is in proximity to humans, wherein continuous lateral elongated members are supported by multiple coils, as shown in FIG. 4B. The lateral elongated members may extend from the spring support in a generally horizontal direction and may be flexible enough to sag visibly under their own weight. For example, the elongated members may be a non-rigid member, such as for example a rope or flexible line.

Figure 6:
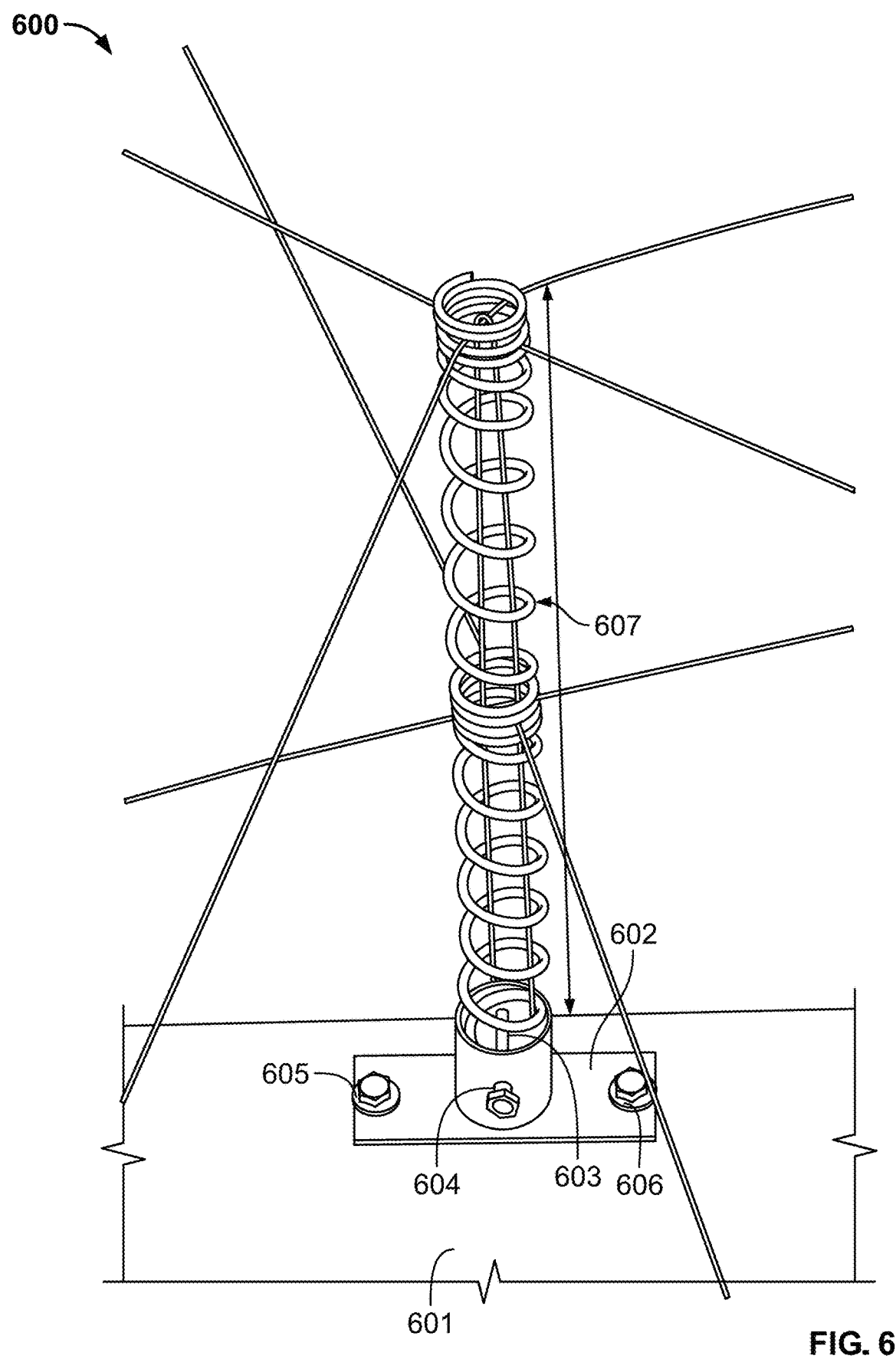
FIG. 6 shows attachment of a coil spring arrangement as shown in FIG. 5 to a horizontal surface using a mounting bracket.

FIG. 6 shows a single resilient assembly 600 attached to a flat surface 601 with the base component 602 for securing the resilient member 607 to the surface 601. The resilient member 607 may comprise a coil spring with live and dead coils as previously described, or other suitable flexible support. The bottom coils 603 fit into the base 602 and are captured with a bolt and nut 604. The base is secured to the flat surface with two screws 605, 606. The base can also be secured with fasteners, nails, magnets, or adhesive. The base end of the coil spring 607 may be ground flat so the coil spring will extend perpendicular to the surface to be protected. Instances of the single spring assembly 600 may be placed over a flat surface, spaced apart as described for the spring assembly 500.

Figure 7:
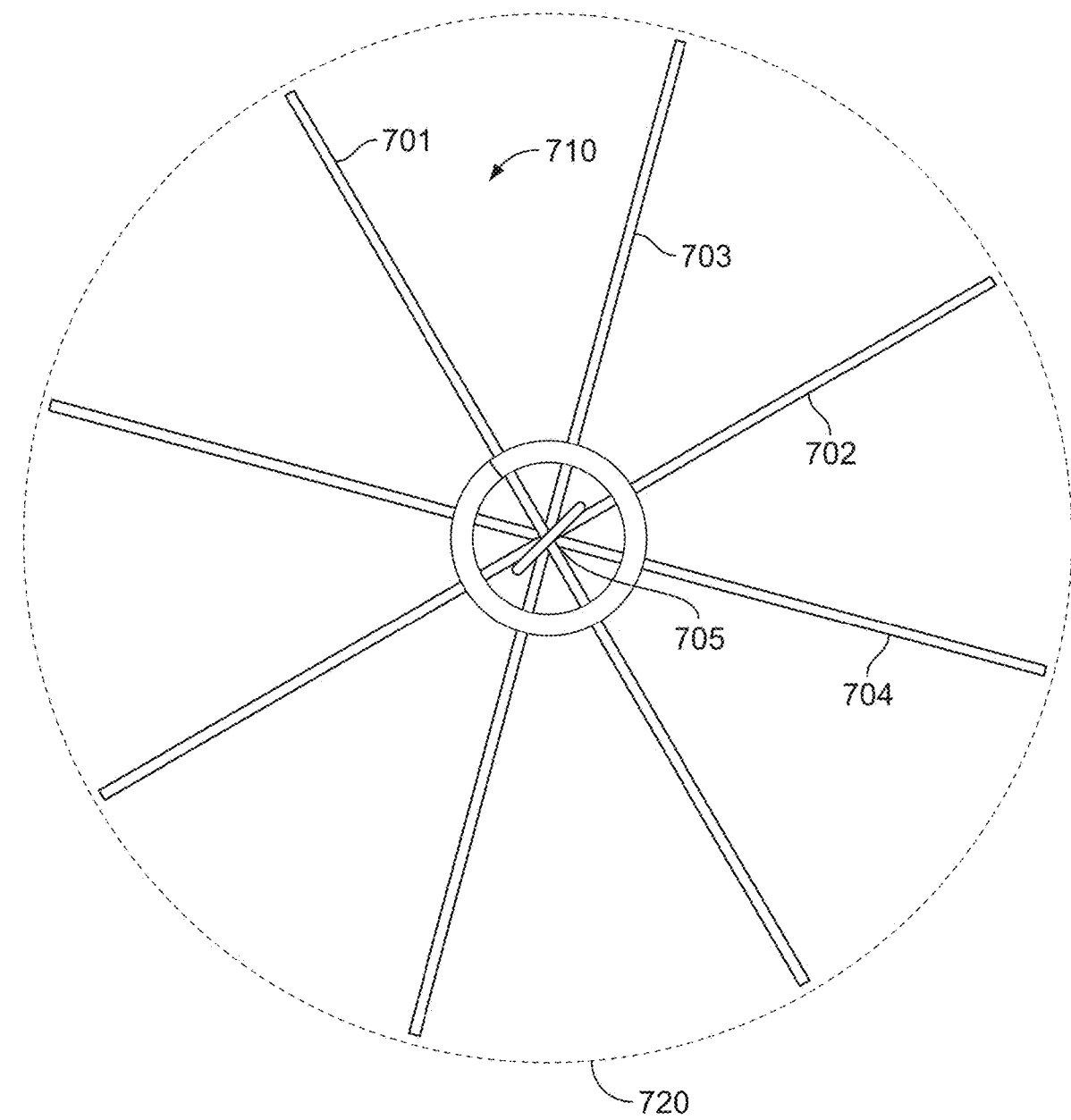
FIG. 7 is a plan view illustrating two pairs of transverse wires attached to and supported by a coil spring support.

Another example of non-parallel lateral wires is shown in FIG. 7, with a top view of a perch deterrent assembly 710 including a single flexible support including spring 700 with two elongated members including wires 701, 702 inserted perpendicularly in between two top dead coils (not pictured), two wires 703, 704 inserted perpendicularly in between two of the middle dead coils (not pictured), and a capture clip 705 inserted at the intersection of the two wires in each dead coil section. In the depicted view, the four inserted wires 701-704 form a star-like pattern with eight rays having equal angles between each ray of the pattern when viewed from above. The middle wires' orientation 703, 704 is rotated 45 degrees from the top wires 701, 702. The top view shows the generally circular area 710 protected by the lateral wires 701, 702 and 703. It should be apparent that any desired surface can be protected from perching birds by arranging similar ones of the assembly 710 over the surface to be protected so that the circular protected areas 720 are adjacent and/or overlapping. Any suitable number of wires may be used to extend over the surface to be protected.

Figure 8:
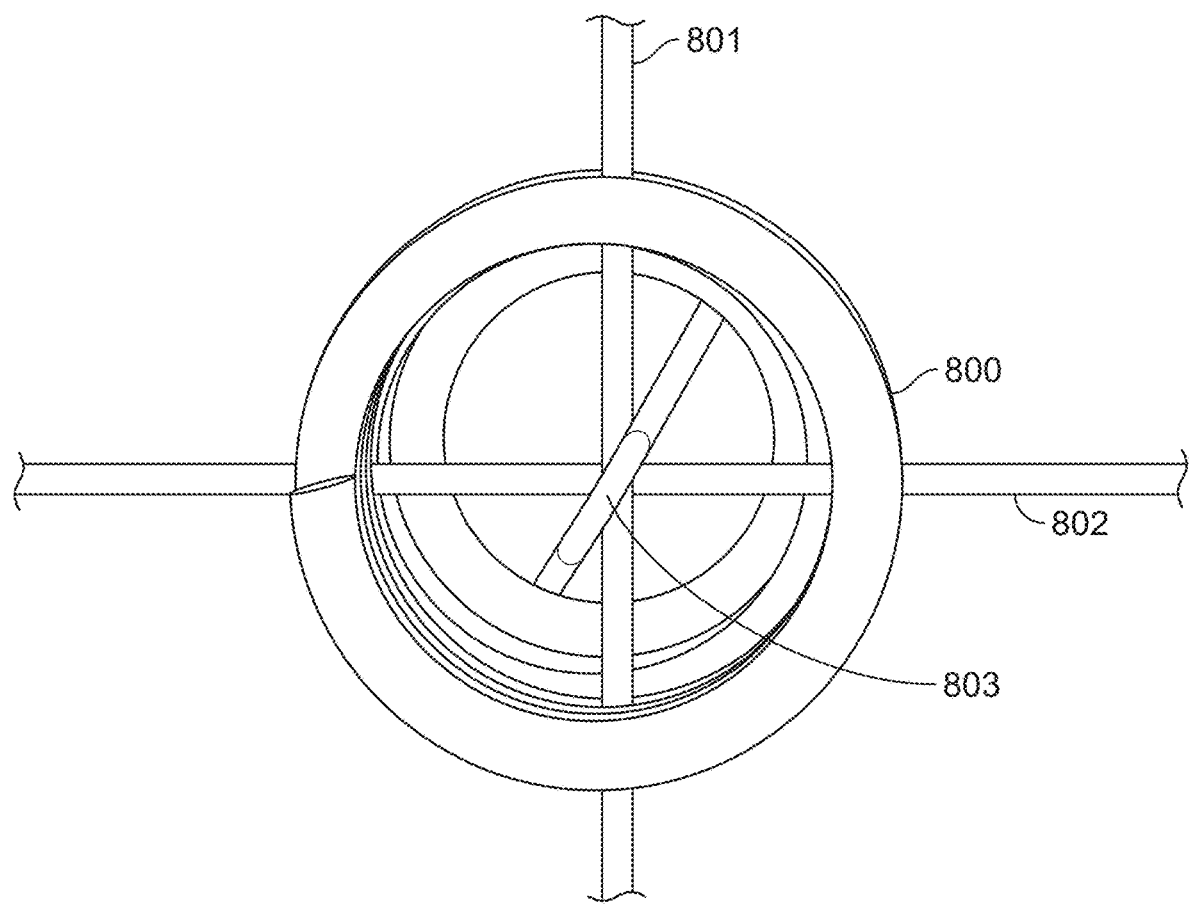
FIG. 8 shows a top view of a wire clip securing a pair of lateral wires.

FIG. 8 shows a close-up top view of a single spring 800 with two wires 801, 802 inserted perpendicularly in between two top dead coils and a capture clip 803 inserted to hold the wires 801, 802 in the spring 800.

Figure 9:
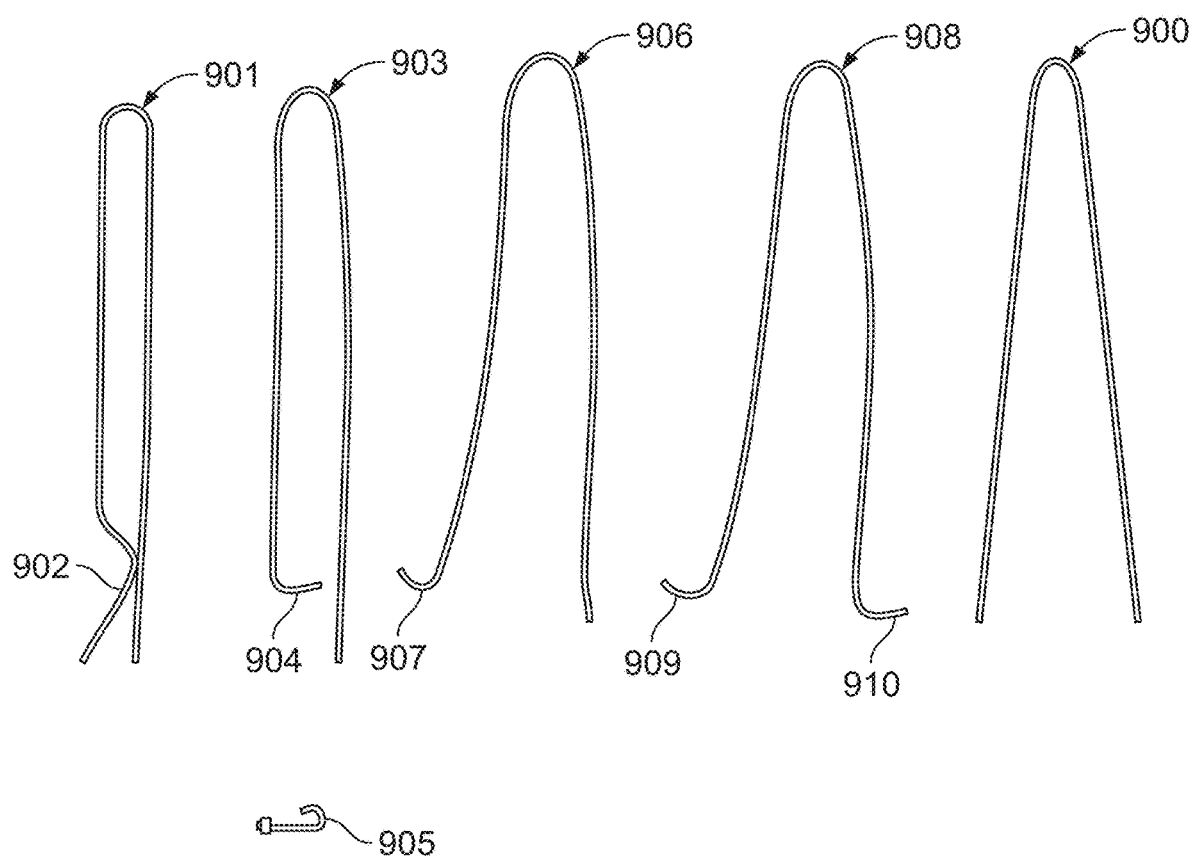
FIG. 9 shows alternative wire clips.

FIG. 9 shows a side view of various side clips to be used as capture clips. A clip 900 is shaped like an upside down 'u'. Clip 901 has one foot 902 bent towards the other foot then bent outwards. Clip 903 has one foot 904 bent inwards towards the other foot with a hook 905. Clip 906 has one foot with an upward hook 907. Clip 908 has two feet with upward hooks 909, 910.

The coils and wires may be formed from suitable materials for the intended application. For example, for marine environments coils may be made from 302/304 or 316 stainless steel. Lateral wires may be 0.062 solid stainless wire or equivalent. In an aspect, wire may be pre-cut length approximately equal to spacing between flexible support for convenience of installation, for example in 5 or 6 foot lengths. In an alternative, lateral members may be or include stranded wire, line or cord, which may be rigid or non-rigid. In another aspect, the illustrated configuration of wires and coil support permits adjustment of spacing during installation without requiring the installer to return to the original end to adjust the spacing through that particular segment.

In an aspect, a slight sag for the wire or cord makes it harder for a bird to gain a purchase on the elongated member. Increased movement of the elongated member makes it more difficult for the bird to obtain a secure grip, while spring back of the flexible support causes a vigorous shaking of the elongated member.

Figure 10A:
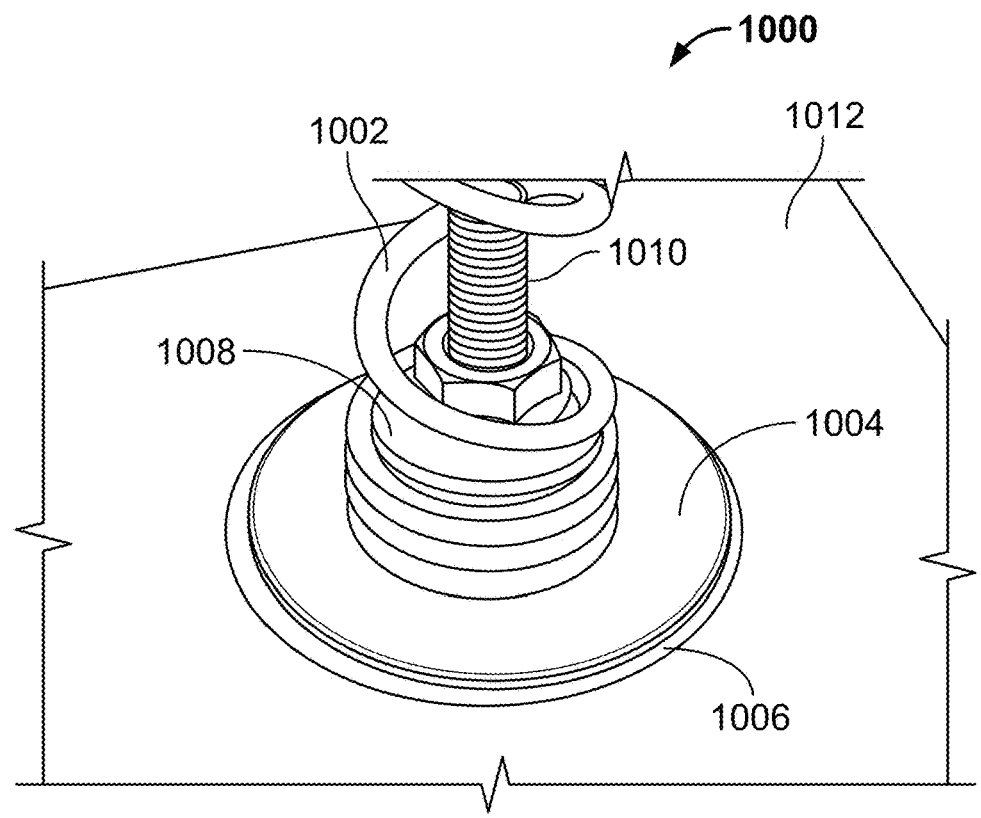
FIG. 10A shows an alternative adhesive mount for flat surfaces.

FIG. 10A shows an alternative adhesive mount assembly 1000 for flat surfaces, such as surface 1012. A metallic base plate 1004 is adhered to the surface 1012 using a suitable adhesive, for example a marine grade or methacrylate adhesive. The flexible support 1002 including a coil spring with dead and live coils as previously shown is attached to the base plate 1004 using a fastener 1010 and washer. All components except the adhesive may be made of stainless steel.

Figure 10B:
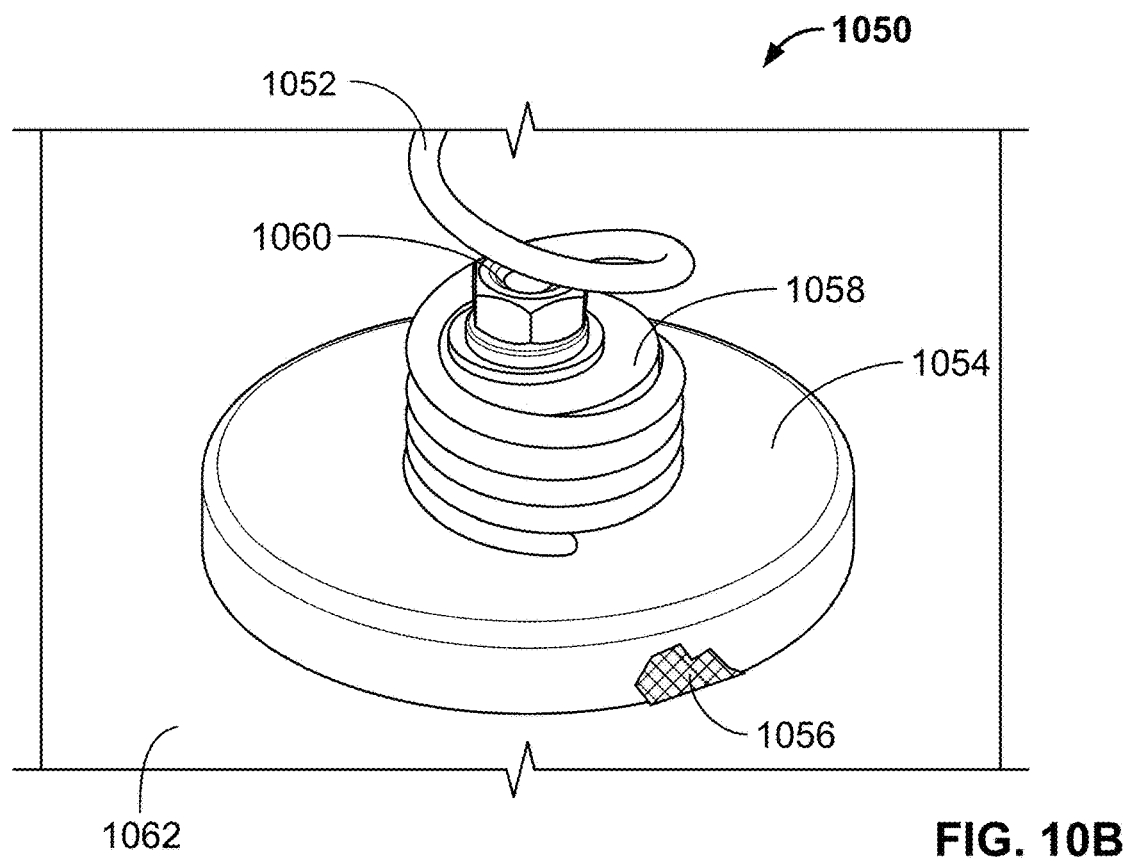
FIG. 10B shows an alternative magnetic mount for ferrous surfaces.

FIG. 10B shows an alternative magnetic mount assembly 1050 for convenient installation and removal from ferrous surfaces such as surface 1062. The flexible support 1052 including a coil spring with dead and live coils as previously shown is attached to a casing 1054 using a fastener 1060 and washer 1058. A magnet 1056 is adhered to an interior of the casing 1054 using any suitable adhesive, for example a marine grade or methacrylate adhesive. The magnet should be strong enough to resist detachment from the surface 1062 due to anticipated lateral loads on the support 1052 during use. All non-magnetic metallic parts may be made of stainless steel.

Thus, a system of two or more flexible supports and lateral elongated members over a railing or other manmade structure reduces risk of injury from bird droppings in workplace environments. Advantageously, each flexible support and lateral elongated member will flex and give way if someone or something were to fall on it, and return to their original position once the load is removed. The springs can easily be installed to a railing or the like using only a nut driver or wrenches.

An assembled system is removable from the railings by pulling the wires out of the coils and if needed, loosening and rotating down or removing the fastener used to attach the flexible support to the protected structure. Disassembly from flat surface installations may be done by similarly removing the wires and unfastening the spring from its holder at the base thereof. The installed base may be left in place for convenient reinstallation, if desired. The simple construction and attachment design minimizes installation and maintenance costs. The installed system is not susceptible to damage from wind load or ice buildup and is resistant to corrosion in hostile environments.

With each coil spring connected to the next by the lateral wires, the springs support the lateral wires and move together. The movement is disconcerting to birds, which instinctively move from the unpredictable barrier when attempting to land. Transfer of kinetic energy from the bird activates the system and creates a dynamic and unstable perch.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An apparatus for preventing perching of birds, comprising:
   at least two flexible supports supporting at least one lateral elongated member over a manmade structure to be protected from perching birds, wherein the at least one lateral elongated member is flexible and slack enough to sag visibly under its own weight and extends generally horizontally between the at least two flexible supports, and wherein each of the at least two flexible supports comprises a coil spring including a portion of live springs for flexibility; and
   a fastener securing a base of each of the flexible supports to the manmade structure in transverse relation thereto.

2. The apparatus of claim 1, wherein the coil spring further includes a portion of dead coils holding the at least one lateral elongated member.

3. The apparatus of claim 1, further comprising a u-shaped clip inserted into each of the at least two flexible supports and encompassing the at least one elongated member between legs thereof.

4. The apparatus of claim 1, wherein the fastener comprises a hose clamp inserted through a lower coil of the each of the at least two flexible supports.

5. The apparatus of claim 1, wherein the fastener comprises a cylindrical receptacle enclosing a lower portion of the each of the at least two flexible supports.

6. The apparatus of claim 1, wherein the fastener comprises a base plate with adhesive.

7. The apparatus of claim 1, wherein the fastener comprises a magnet.

8. A method for protecting a manmade structure from perching birds, comprising installing an apparatus to the manmade structure, wherein the apparatus comprises:
   a flexible support supporting at least one lateral elongated member over a surface to be protected from perching birds, wherein the flexible support comprises a coil spring including a portion of live springs for flexibility and the coil spring further includes a portion of dead coils holding the at least one lateral elongated member; and
   a fastener securing a base of the flexible support to the surface in transverse relation thereto.

9. The method of claim 8, further comprising supporting the at least one lateral member by a second flexible support and securing the second flexible in transverse relation to the surface.

10. The method of claim 8, wherein the at least one lateral elongated member comprises at least three elongated members arranged in a star-like pattern.

11. An apparatus for preventing perching of birds, comprising:
   a flexible support supporting at least one lateral elongated member over a surface to be protected from perching birds, wherein the at least one lateral elongated member is flexible enough to visibly sag under its own weight, and wherein the flexible support comprises a coil spring including a portion of live springs for flexibility; and
   a fastener securing a base of the flexible support to the surface in transverse relation thereto.

12. The apparatus of claim 11, wherein the at least one lateral elongated member comprises two perpendicular elongated members.

13. The apparatus of claim 11, wherein the at least one lateral elongated member comprises at least three elongated members arranged in a star-like pattern.

14. The apparatus of claim 11, wherein the coil spring further includes a portion of dead coils holding the at least one lateral elongated member.

15. The apparatus of claim 11, further comprising a u-shaped clip inserted into the flexible support and encompassing the at least one lateral elongated member between legs thereof.

16. The apparatus of claim 11, wherein the fastener comprises a cylindrical receptacle enclosing a lower portion of the flexible support.

17. The apparatus of claim 11, wherein the at least one lateral elongated member is transverse to the flexible support and extends generally horizontally there from.

* * * * *